United States Patent
Thompson

(10) Patent No.: US 10,239,681 B2
(45) Date of Patent: Mar. 26, 2019

(54) DRUM UNLOADER

(71) Applicant: Knoll America, Madison Heights, MI (US)

(72) Inventor: David L. Thompson, Rochester Hills, MI (US)

(73) Assignee: Knoll America, Madison Heights, MI (US)

( * ) Notice: Subject to any disclaimer, the term of this patent is extended or adjusted under 35 U.S.C. 154(b) by 168 days.

(21) Appl. No.: 15/497,507

(22) Filed: Apr. 26, 2017

(65) Prior Publication Data

US 2018/0312325 A1    Nov. 1, 2018

(51) Int. Cl.
*B65D 83/00* (2006.01)
*F15B 11/08* (2006.01)
*F15B 13/042* (2006.01)

(52) U.S. Cl.
CPC .......... *B65D 83/0044* (2013.01); *F15B 11/08* (2013.01); *F15B 13/042* (2013.01); *F15B 2211/2053* (2013.01); *F15B 2211/25* (2013.01); *F15B 2211/7051* (2013.01)

(58) Field of Classification Search
CPC ..... B65D 83/0005; B67D 7/645; F15B 11/08; F15B 13/042; F15B 2211/2053; F15B 2211/25; F15B 2211/7051
See application file for complete search history.

(56) References Cited

U.S. PATENT DOCUMENTS

| | | | | |
|---|---|---|---|---|
| 2,254,317 A | * | 9/1941 | Roberts | B65B 69/005 222/173 |
| 3,412,903 A | * | 11/1968 | Van Riper, Jr. | B29B 13/022 219/421 |
| 3,608,757 A | * | 9/1971 | Tary | B65G 65/00 294/68.24 |
| 4,024,854 A | * | 5/1977 | Park | B05C 11/1042 100/315 |
| 4,090,640 A | | 5/1978 | Smith et al. | |
| 4,195,755 A | * | 4/1980 | Slautterback | B29B 13/022 219/230 |
| 4,227,069 A | | 10/1980 | Gardner et al. | |
| 4,355,734 A | * | 10/1982 | Moore | B05C 21/00 137/341 |
| 4,534,493 A | | 8/1985 | Sedran | |
| 4,651,897 A | | 3/1987 | Johnson | |

(Continued)

*Primary Examiner* — Thomas E Lazo
(74) *Attorney, Agent, or Firm* — Harness, Dickey & Pierce, P.L.C.

(57) ABSTRACT

A drum unloader may include a pump assembly, a motor, a plate, a piston-cylinder assembly, and a sensor. The motor drives the pump assembly. The plate is mounted to the pump assembly and includes an inlet to the pump assembly. The piston-cylinder assembly includes a housing, a piston, and a piston rod. The housing defines a bore. The piston is received within the bore and cooperates with the housing to define a first cavity and a second cavity. The piston rod is attached to and extends from the piston such that the piston rod extends through the first cavity. The piston rod is coupled to the pump assembly, the motor and the plate such that movement of the piston within the bore causes corresponding movement of the pump assembly, the motor and the plate relative to the housing. The sensor measures a pressure within the second cavity.

20 Claims, 4 Drawing Sheets

(56) References Cited

U.S. PATENT DOCUMENTS

| | | | | |
|---|---|---|---|---|
| 4,744,701 | A * | 5/1988 | Chasteen | B65G 65/23 |
| | | | | 222/166 |
| 4,945,955 | A * | 8/1990 | Murphy | B67D 7/725 |
| | | | | 137/205 |
| 5,188,518 | A | 2/1993 | Saita | |
| 5,244,362 | A | 9/1993 | Conally | |
| 6,046,437 | A * | 4/2000 | Frates | B29B 13/022 |
| | | | | 219/426 |
| 6,193,105 | B1 | 2/2001 | Ream et al. | |
| 6,745,546 | B2 * | 6/2004 | Tanner | A61J 3/07 |
| | | | | 53/140 |
| 6,755,427 | B1 * | 6/2004 | Bray | B62B 3/104 |
| | | | | 222/405 |
| 8,544,699 | B2 | 10/2013 | Quam | |
| 2008/0023082 | A1 * | 1/2008 | Schucker | B29B 13/022 |
| | | | | 137/565.17 |
| 2016/0002025 | A1 | 1/2016 | Waizenauer et al. | |

\* cited by examiner

DRUM UNLOADER

FIELD

The present disclosure relates to an apparatus (i.e., a drum unloader) for unloading (i.e., removing) fluids and/or other matter from a container (e.g., a drum).

BACKGROUND

This section provides background information related to the present disclosure and is not necessarily prior art.

Viscous food products, industrial products, and cosmetic products (e.g., viscous fluids or fluids with suspended solids, such as peanut butter, tomato paste, adhesives, epoxies, lipsticks, or creams, for example) are often shipped to manufacturers in large drums (e.g., 55-gallon drums). Efficiently removing such materials from the drums can be difficult, as these materials often either do not flow (or flow very slowly) under the force of gravity alone. Furthermore, conventional pumps or unloaders are often unable to remove all of the material out of the drum and/or remove material in a reasonable amount of time. The present disclosure provides a drum unloader that can efficiently, effectively, and quickly unload viscous material from a large drum.

SUMMARY

This section provides a general summary of the disclosure, and is not a comprehensive disclosure of its full scope or all of its features.

In one form, the present disclosure provides a drum unloader that may include a pump assembly, a motor, a plate, a piston-cylinder assembly, and a pressure sensor. The motor drives the pump assembly. The plate is mounted to the pump assembly and includes an inlet aperture fluidly connected with the pump assembly. The piston-cylinder assembly includes a cylinder housing, a piston, and a piston rod. The cylinder housing defines a cylindrical bore. The piston is received within the cylindrical bore and cooperates with the cylinder housing to define a first cavity and a second cavity. The piston is disposed axially between the first and second cavities. The piston rod is attached to and extends from the piston such that the piston rod extends through the first cavity. The piston rod is coupled to the pump assembly, the motor and the plate such that movement of the piston within the cylindrical bore causes corresponding movement of the pump assembly, the motor and the plate relative to the cylinder housing. The pressure sensor may be mounted to the cylinder housing and is configured to measure a fluid pressure within the second cavity.

In some configurations, the drum unloader includes a first control valve and a second control valve. The cylinder housing includes a first port and a second port. The first port is in fluid communication with the first cavity and the first control valve. The second port is in fluid communication with the second cavity and the second control valve. The first and second control valves control air flow into the first and second cavities, respectively, through the first and second ports, respectively.

In some configurations, the drum unloader includes a control module in communication with the pressure sensor and the first and second control valves. The control module may control the first and second control valves based on data received from the pressure sensor.

In some configurations, the control module is in communication with the motor and controls operation of the motor based on data received from the pressure sensor.

In some configurations, the drum unloader includes a proximity sensor mounted to the cylinder housing and configured to detect a presence of the piston in a position adjacent the proximity sensor.

In some configurations, the control module is in communication with the proximity sensor and controls the motor and the first and second control valves based on a communication from the proximity sensor.

In some configurations, the control module shuts down the motor after a predetermined amount of time following receipt of the communication from the proximity sensor.

In some configurations, the plate includes a blow-down opening extending through the plate. The blow-down opening is coupled with a blow-down conduit in selective communication with a compressed-air supply.

In some configurations, the drum unloader includes a blow-down valve and an air-pressure sensor disposed along the blow-down conduit between the blow-down valve and the blow-down opening. The blow-down valve and the air-pressure sensor are in communication with the control module. The control module moves the blow-down valve to an open position in response to the air-pressure sensor measuring a pressure value that is less than a predetermined pressure value.

In some configurations, the drum unloader includes a cross member attached to the piston rod and supporting the motor and pump assembly.

In some configurations, the pump assembly includes a progressive cavity pump.

In another form, the present disclosure provides a method that may include positioning a container below a plate attached to a pump assembly, the plate defining an inlet to the pump assembly, the container containing a volume of material to be pumped by the pump assembly; moving the pump assembly and the plate toward a surface of the material within the container and receiving the plate within the container; determining whether the plate is in contact with the surface of the material based on a pressure measurement within a cavity in a piston-cylinder assembly; starting operation of a motor that drives the pump assembly in response to determining that the plate is in contact with the surface of the material; and moving the pump assembly and the plate toward a bottom end of the container while the motor is driving the pump assembly.

In some configurations, moving the pump assembly and the plate relative to the container includes providing airflow into one of a first cavity and a second cavity of the piston-cylinder assembly while allowing airflow out of another one of the first and second cavities. The first and second cavities are disposed within a cylindrical bore and are separated from each other by a piston that is movable within the cylindrical bore.

In some configurations, the method includes determining whether the piston has reached a predetermined position within the cylindrical bore.

In some configurations, the method includes running the motor and moving the pump assembly and the plate toward the bottom end of the container for a predetermined amount of time after determining that the piston has reached the predetermined position.

In some configurations, the method includes shutting down the motor after the predetermined amount of time.

In some configurations, the method includes moving the pump assembly and plate away from the bottom end of the container after the predetermined amount of time.

In some configurations, the method includes providing airflow into a space between the plate and the bottom end of the container while the pump assembly and plate are moving away from the bottom end of the container.

In some configurations, the method includes controlling the airflow into the space based on an air-pressure within the space.

In some configurations, a proximity sensor determines whether the piston has reached the predetermined position within the cylindrical bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
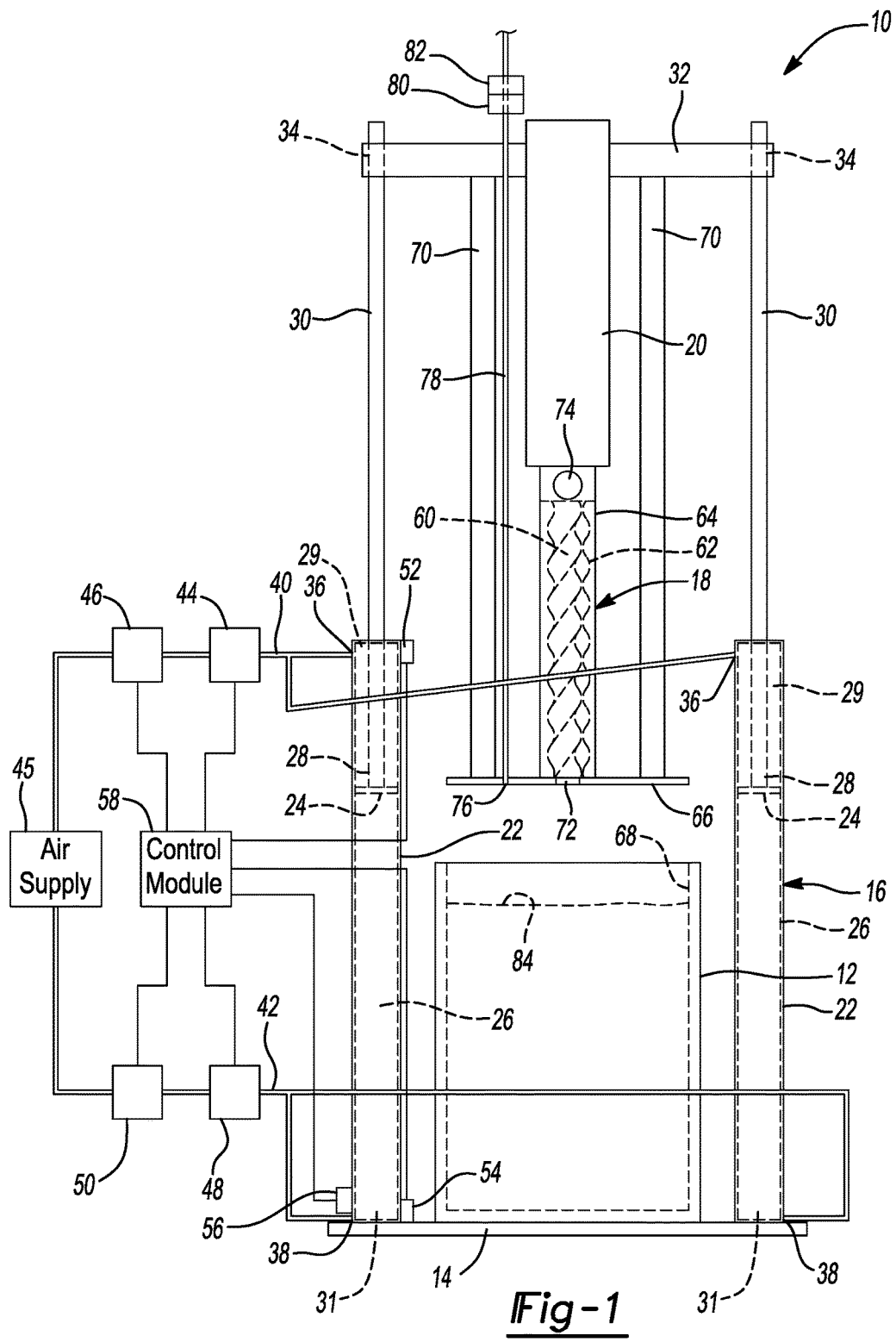
FIG. 1 is a schematic representation of a drum unloader according to the principles of the present disclosure with a follower plate of the drum unloader in a first position above a drum containing material to be unloaded.

Example embodiments will now be described more fully with reference to the accompanying drawings.

With reference to FIGS. 1-4, a drum unloader 10 is provided that is operable to pump matter (e.g., viscous fluids or fluids with suspended solids, such as cosmetic products such as lipsticks or creams, food products such as peanut butter or tomato paste, or industrial products such as adhesives or epoxies, for example) out of a container such as a drum 12 (such as a cylindrical 55-gallon drum, for example). The drum unloader 10 may include a base 14, a piston-cylinder assembly 16, a pump assembly 18, and a motor 20. The base 14 may support the piston-cylinder assembly 16, pump assembly 18, and motor 20. The drum 12 may be positioned on the base 14 below the pump assembly 18.

The piston-cylinder assembly 16 may include a pair of cylinder housings 22 and a pair of pistons 24. The cylinder housings 22 may be mounted on the base 14 and define elongated cylindrical bores 26 that slidably receive the pistons 24. Each of the pistons 24 is attached to a first end 28 of a respective piston rod 30. Each piston 24 cooperates with the cylindrical wall of the respective one of the bores 26 to define a first cavity 29 (i.e., a cavity through which the piston rod 30 extends) between the upper axial end of the bore 26 and piston 24 and a second cavity 31 between the lower axial end of the bore 26 and the piston 24.

A cross member 32 may extend between the piston rods 30 and may be attached to second ends 34 of the piston rods 30. The cross member 32 may support the pump assembly 18 and motor 20. In this manner, the pump assembly 18 and motor 20 are movable with the pistons 24 and piston rods 30 up and down relative to the cylinder housings 22.

Each of the cylinder housings 22 includes a first port 36 and a second port 38. Each of the first ports 36 is in communication with a respective one of the first cavities 29 at a location above the piston 24 when the pistons 24 are in their uppermost positions (i.e., the top of the pistons' upward stroke; shown in FIG. 1). Each of the second ports 38 is in communication with a respective one of the second cavities 31 at a location below the piston 24 when the pistons 24 are in their lowermost positions (i.e., the bottom of the pistons' downward stroke; shown in FIG. 3). The first ports 36 are fluidly connected to a first conduit 40, and the second ports 38 are fluidly connected to a second conduit 42. The first and second conduits 40, 42 may be fluidly connected to a compressed-air supply 45. The first conduit 40 may include a first control valve (e.g., a solenoid valve) 44 and a first regulator 46. The second conduit 42 may include a second control valve (e.g., a solenoid valve) 48 and a second regulator 50. As will be described in more detail below, the first and second control valves 44, 48 are operable to control flows of air into and out of the cavities 29, 31 through the first and second ports 36, 38 to control up and down movement of the pistons 24—and therefore, movement of the pump assembly 18 and motor 20—relative to the cylinder housings 22.

In some configurations, the first control valve 44 may be a three-way valve that is movable among a first position allowing air to flow from the compressed-air supply 45 to the first cavities 29 via the first ports 36, a second position preventing airflow through the through the first ports 36 (i.e., preventing airflow into and out of the first cavities 29), and a third position allowing air to vent out of the first cavities 29 to the atmosphere. Similarly, in some configurations, the second control valve 48 may be a three-way valve that is movable among a first position allowing air to flow from the compressed-air supply 45 to the second cavities 31 via the second ports 38, a second position preventing airflow through the through the second ports 38 (i.e., preventing airflow into and out of the second cavities 31), and a third position allowing air to vent out of the second cavities 31 to the atmosphere. In other configurations, the first and second control valves 44, 48 may be movable only between the first and second positions to selectively allow and prevent airflow into the first and second cavities 29, 31 and additional valves (not shown) may selectively allow and prevent venting of air from the first and second cavities 29, 31 to the atmosphere.

One or both of the cylinder housings 22 may include a first pressure sensor 52 adapted to measure a pressure of air within the first cavity 29 (i.e., at a location above the top of the upward stroke of the piston 24). One or both of the cylinder housings 22 may also include a second pressure sensor 54 adapted to measure a pressure of air within the second cavity 31 (i.e., at a location below the bottom of the downward stroke of the piston 24). Furthermore, one or both of the cylinder housings 22 may include a proximity sensor 56 mounted thereto, operable to sense the presence of the piston 24 at a position within the bore 26 that is adjacent the proximity sensor 56. The proximity sensor 56 may be disposed at or near the bottom of the cylinder housing 22 (e.g., at or near the bottom of the downward stroke of the piston 24). The proximity sensor 56 can be any suitable type of proximity sensor such as a Hall effect sensor, an electromagnetic sensor, an inductive sensor, or a photoelectric sensor, for example.

A control module 58 may be in wired or wireless communication with the valves 44, 48, the regulators 46, 50, the sensors 52, 54, 56, and the motor 20. The control module 58 may receive data from the sensors 52, 54, 56 and may control operation of the valves 44, 48, regulators 46, 50, and the motor 20.

The pump assembly 18 may be a progressive cavity pump, for example, and may include a helical-shaped rotor 60 that is rotatably disposed within a double-helical-shaped chamber 62 in a stator 64. The rotor 60 is connected to the motor 20 such that operation of the motor 20 causes rotation of the rotor 60 within the chamber 62.

Figure 2:
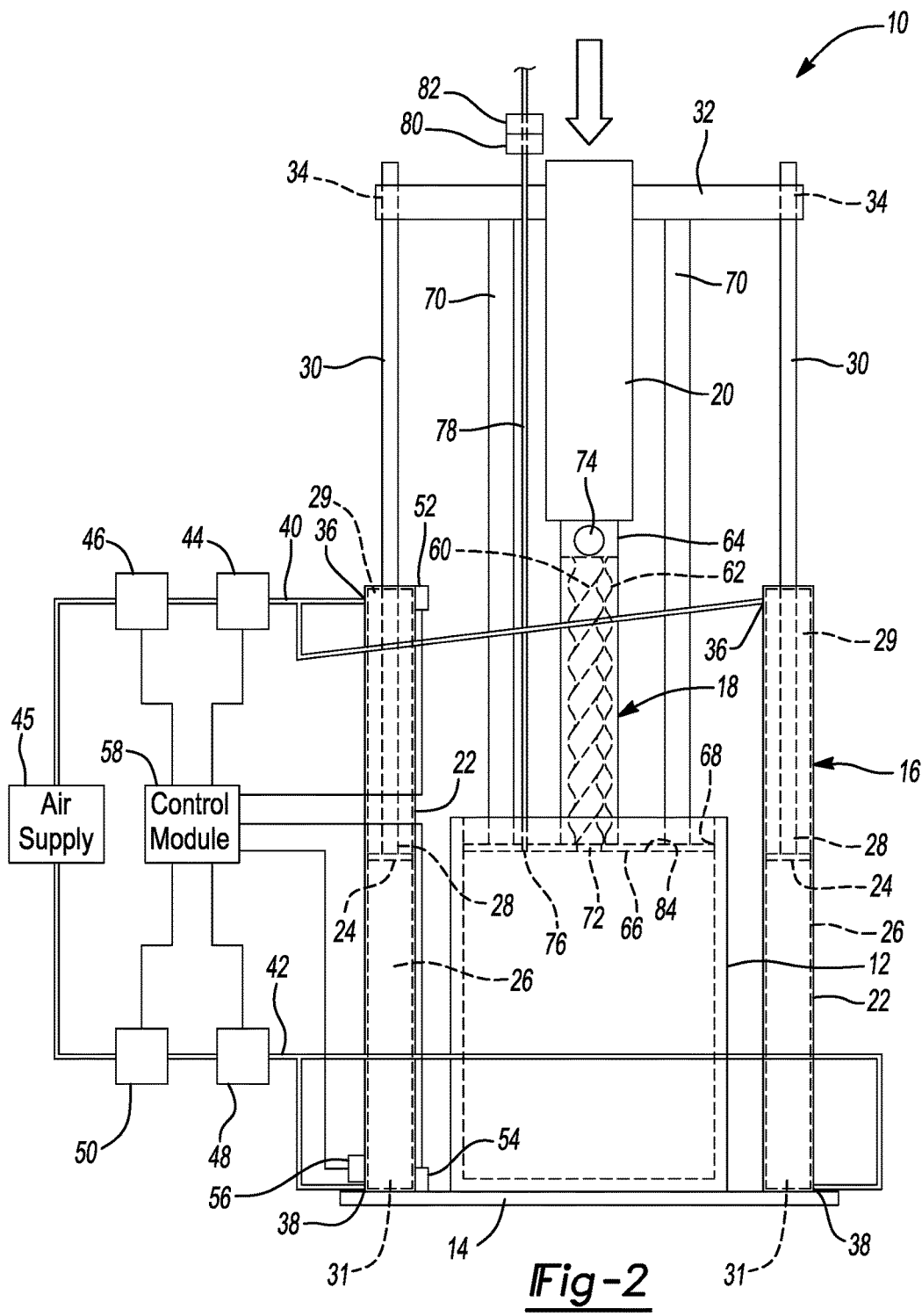
FIG. 2 is a schematic representation of the drum unloader with the follower plate in a second position in contact with a surface of the material to be unloaded.
Figure 3:
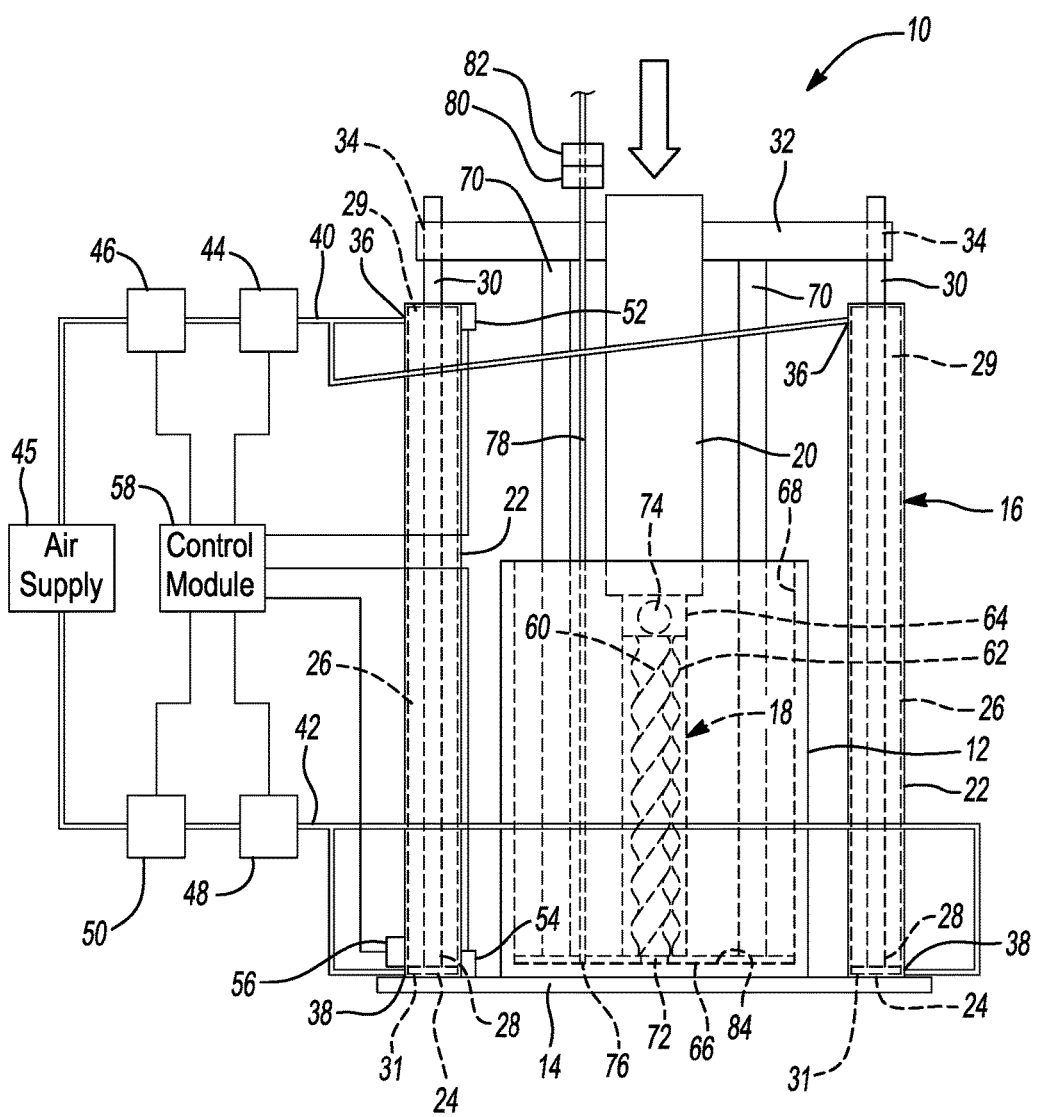
FIG. 3 is a schematic representation of the drum unloader with the follower plate at a bottom of the drum after pumping the material out of the drum.
Figure 4:
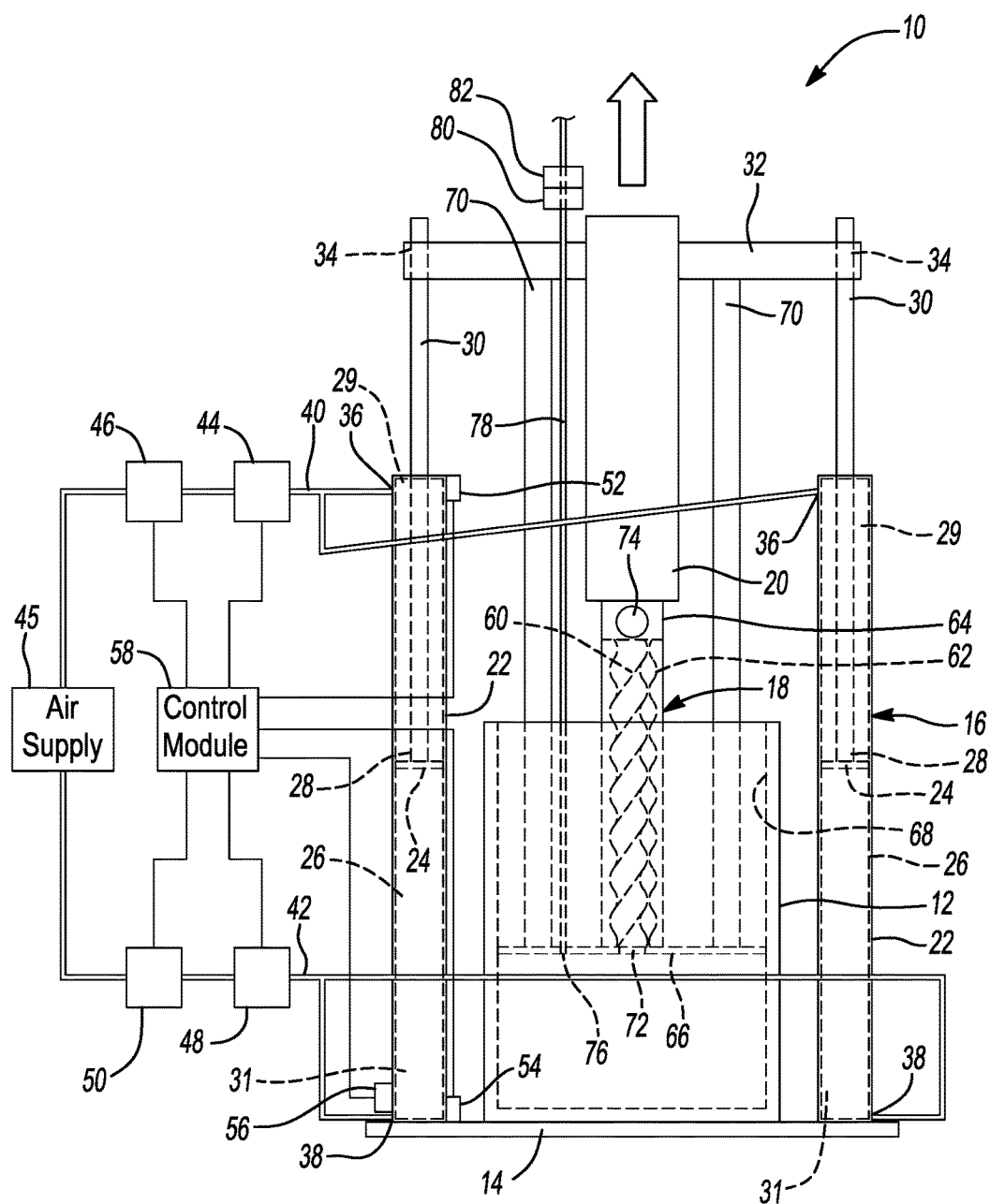
FIG. 4 is a schematic representation of the drum unloader with the follower plate moving upward from the bottom of the drum.

A plate (e.g., a follower plate) 66 may be mounted (directly or indirectly) to an end of the stator 64. The plate 66 may have a circular shaped and may be sized to fit within the drum 12. An outer periphery of the plate 66 may include an annular seal or wiper (formed from silicon rubber, for example, or any other suitable elastomer or polymer) that is sized to wipe or rub against an inner diametrical surface 68 of the drum 12 when the plate 66 is received in the drum 12, as shown in FIGS. 2-4. The specific shape and size of the plate 66 may be selected based on the shape and size of the drum 12 that the user is unloading. In some configurations, one or more support members 70 may extend between and engage the plate 66 and the cross member 32 to support and reinforce the plate 66.

The plate 66 may also include an aperture 72 that extends axially through the center of the plate 66 (i.e., the aperture 72 extends through the plate 66 along a longitudinal axis of the plate 66). The aperture 72 is in communication with the chamber 62 such that the aperture 72 defines an inlet to the pump assembly 18. Another aperture 74 may be formed in the stator 64 (or in a housing connected to the stator 64) and may be in communication with the chamber 62 such that the aperture 74 defines an outlet from the pump assembly 18. That is, during operation of the pump assembly 18, material within the drum 12 is drawn into the chamber 62 through the inlet aperture 72 in the plate 66 and is pumped up through the chamber 62 and is discharged from the pump assembly 18 through the outlet aperture 74. While not shown in the figures, a hose or other conduit may be connected to the outlet aperture 74 to direct the material pumped from the drum 12 to a desired location.

The plate 66 may also include a blow-down opening or port 76. A blow-down conduit 78 may be fluidly connected to the blow-down opening 76 and the compressed-air supply 45. An air-pressure sensor 80 may be disposed along the blow-down conduit 78 to measure air pressure within the blow-down conduit 78. A blow-down valve (e.g., a solenoid valve) 82 may be disposed along the blow-down conduit 78 between the air-pressure sensor 80 and the compressed-air supply 45. The air-pressure sensor 80 and the blow-down valve 82 may be in communication with the control module 58. The control module 58 may move the blow-down valve 82 to an open position (i.e., to allow compressed air from the compressed-air supply 45 to flow through the blow-down conduit 78 and through the blow-down opening 76) in response to the air pressure measured by the air-pressure sensor 80 dropping below a predetermined value. The control module 58 may move the blow-down valve 82 to a closed position in response to the air pressure measured by the air-pressure sensor 80 reaching or exceeding the predetermined value to prevent communication between the compressed-air supply 45 and the blow-down opening 76.

With continued reference to FIGS. 1-4, operation of the drum unloader 10 will be described in detail. As described above, the drum unloader 10 is operable to unload (i.e., pump) material (e.g., viscous fluids or fluids with suspended solids, such as cosmetic products such as lipsticks or creams, food products such as peanut butter or tomato paste, or industrial products such as adhesives or epoxies, for example) out of the drum 12. To pump material from the drum 12, the drum 12 may be positioned onto the base 14 below the plate 66 (as shown in FIG. 1) with the drum lid (not shown) removed from the drum 12. Thereafter, the piston-cylinder assembly 16 can move the pump assembly 18 downward so that the plate 66 can be received inside of the drum 12 and placed in contact with the surface 84 of the material to be pumped (as shown in FIG. 2). With the plate 66 in contact with the surface 84 of the material to be pumped, the motor 20 may begin operation of the pump assembly 18 while the piston-cylinder assembly 16 continues to move the pump assembly 18 downward at a pace that substantially matches the pace at which the material is being pumped out of the drum by the pump assembly 18. When the plate 66 reaches the bottom of the drum 12 (i.e., when all or substantially all of the material has been pumped out of the drum 12), the pump assembly 18 is shut down, and the piston-cylinder assembly 16 may move the pump assembly 18 and plate 66 upward and out of the drum 12.

To move the pump assembly 18, motor 20 and plate 66 downward relative to the base 14 and drum 12, the control module 58 may: (a) move the first control valve 44 into the first position (described above) to allow air to flow from the compressed-air supply 45 and into the first cavities 29 of the piston-cylinder assembly 16; and (b) move the second control valve 48 to the third position to allow the pistons 24 to push air out of the second cavities 31 to the atmosphere as the pistons 24 move downward. While the pump assembly 18 is moving from the position shown in FIG. 1 (i.e., a position in which the plate 66 is above the surface 84 of the material to be pumped) toward the position shown in FIG. 2 (i.e., a position in which the plate 66 is in contact with the surface 84 of the material to be pumped), the air pressure within the second cavities 31 (which is measured by the second pressure sensor 54) will be greater than atmospheric pressure.

Once the control module 58 determines that the air pressure within the second cavities 31 has reached atmospheric pressure or a value near atmospheric pressure (i.e., from data received from the second pressure sensor 54), the control module 58 determines that the plate 66 is in contact with the surface 84 of the material to be pumped. With the plate 66 in contact with the surface 84, the control module 58 can turn on the motor 20 to run the pump assembly 18. Thereafter, the control module 58 may continue to supply air to the first cavities 29 and vent air from the second cavities 31 to continue the downward movement of the pump assembly 18 and plate 66 toward the bottom of the drum 12 while continuing operation of the motor 20 and pump assembly 18 to pump the material in the drum 12 through the inlet aperture 72, through the pump assembly 18 and through the outlet aperture 74.

When the pistons 24 move down to (or sufficiently near to) the proximity sensor 56, the proximity sensor 56 will trip and communicate the trip to the control module 58, indicating that the pistons 24 are near the bottom of their range of travel within the bore 26. After receiving the trip notification from the proximity sensor 56, the control module 58 may continue to run the pump assembly 18 and move the pump assembly 18 downward for an additional predetermined amount of time before shutting down the motor 20 and moving the first and second control valves 44, 48 to the second position to prevent airflow into or out of the first and second cavities and stop. The predetermined amount of time is selected based on properties of the material to be pumped (e.g., viscosity), an operating speed of the pump assembly 18, and a speed at which the piston-cylinder assembly 16 is moving the pump assembly 18 downward. That is, the predetermined amount of time is selected so that the pump assembly 18 can bottom-out within the drum 12 (as shown in FIG. 3) and pump all or substantially all of the material out of the drum 12 without dry-running the pump assembly 18.

After shutdown of the pump assembly 18 (i.e., following the predetermined amount of time), the control module 58 may move the pump assembly 18, motor 20 and plate 66 upward toward the position shown in FIG. 1 (i.e., to move the pump assembly 18, motor 20 and plate 66 out of the drum 12). To move the pump assembly 18, motor 20 and plate 66 upward, the control module 58 may: (a) move the second control valve 48 into the first position (described above) to allow air to flow from the compressed-air supply 45 and into the second cavities 31 of the piston-cylinder assembly 16; and (b) move the first control valve 44 to the third position to allow the pistons 24 to push air out of the first cavities 29 to the atmosphere as the pistons 24 move upward.

Movement of the pump assembly 18, motor 20 and plate 66 away from the bottom of the drum 12 will tend to create suction in the drum 12 between the plate 66 and the bottom of the drum 12. When the control module 58 receives data from the air-pressure sensor 80 in the blow-down conduit 78 indicating that the air pressure within the drum 12 between the plate 66 and the bottom of the drum 12 is less than a predetermined value (e.g., atmospheric pressure), the control module 58 may open the blow-down valve 82 to allow air from the compressed-air supply 45 to flow into the space between the plate 66 and the bottom of the drum 12 to bring the air pressure within the space between the plate 66 and the bottom of the drum 12 to atmospheric pressure or above. The blow-down valve 82 may be left continuously open during the upward movement of the pump assembly 18, motor 20 and plate 66 or the blow-down valve 82 may be intermittently opened and closed to regulate the pressure within the space between the plate 66 and the bottom of the drum 12.

The control module 58 may also control the upward movement of the pump assembly 18, motor 20 and plate 66 away from the bottom of the drum 12 based on pressure data from the air-pressure sensor 80 to ensure that the air pressure within the space between the plate 66 and the bottom of the drum 12 is at or above atmospheric pressure. That is, the control module 58 may control the valves (44, 48) to selectively slow down or stop the upward movement of the pump assembly 18, motor 20 and plate 66 away from the bottom of the drum 12 to provide time for the space between the plate 66 and the bottom of the drum 12 to be adequately pressurized by the air flowing into the space via the blow-down conduit 78.

After the plate 66 is removed from the drum 12, the empty drum 12 can be removed from the base 14, and another full drum can, if desired, be placed on the base 14 to repeat the process above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drum unloader comprising:
    a pump assembly;
    a motor driving the pump assembly;
    a plate mounted to the pump assembly and including an inlet aperture fluidly connected with the pump assembly;
    a piston-cylinder assembly including a cylinder housing, a piston, and a piston rod, the cylinder housing defining a cylindrical bore, the piston received within the cylindrical bore and cooperating with the cylinder housing to define a first cavity and a second cavity, the piston disposed axially between the first and second cavities, the piston rod attached to and extending from the piston such that the piston rod extends through the first cavity, the piston rod coupled to the pump assembly, the motor and the plate such that movement of the piston within the cylindrical bore causes corresponding movement of the pump assembly, the motor and the plate relative to the cylinder housing; and a pressure sensor mounted to the cylinder housing and configured to measure a fluid pressure within the second cavity.

2. The drum unloader of claim 1, further comprising a first control valve and a second control valve, wherein the cylinder housing includes a first port and a second port, the first port is in fluid communication with the first cavity and the first control valve, and the second port in fluid communication with the second cavity and the second control valve, wherein the first and second control valves control air flow into the first and second cavities, respectively, through the first and second ports, respectively.

3. The drum unloader of claim 2, further comprising a control module in communication with the pressure sensor and the first and second control valves, the control module controlling the first and second control valves based on data received from the pressure sensor.

4. The drum unloader of claim 3, wherein the control module is in communication with the motor and controls operation of the motor based on data received from the pressure sensor.

5. The drum unloader of claim 4, further comprising a proximity sensor mounted to the cylinder housing and configured to detect a presence of the piston in a position adjacent the proximity sensor.

6. The drum unloader of claim 5, wherein the control module is in communication with the proximity sensor and controls the motor and the first and second control valves based on a communication from the proximity sensor.

7. The drum unloader of claim 6, wherein the control module shuts down the motor after a predetermined amount of time following receipt of the communication from the proximity sensor.

8. The drum unloader of claim 7, wherein the plate includes a blow-down opening extending through the plate, wherein the blow-down opening is coupled with a blow-down conduit in selective communication with a compressed-air supply.

9. The drum unloader of claim 8, further comprising a blow-down valve and an air-pressure sensor disposed along the blow-down conduit between the blow-down valve and the blow-down opening, wherein the blow-down valve and the air-pressure sensor are in communication with the control module, and wherein the control module moves the blow-down valve to an open position in response to the air-pressure sensor measuring a pressure value that is less than a predetermined pressure value.

10. The drum unloader of claim 9, further comprising a cross member attached to the piston rod and supporting the motor and pump assembly.

11. The drum unloader of claim 9, wherein the pump assembly includes a progressive cavity pump.

12. A method comprising:
positioning a container below a plate attached to a pump assembly, the plate defining an inlet to the pump assembly, the container containing a volume of a material to be pumped by the pump assembly;
moving the pump assembly and the plate toward a surface of the material within the container and receiving the plate within the container;
determining whether the plate is in contact with the surface of the material based on a pressure measurement within a cavity in a piston-cylinder assembly;
starting operation of a motor that drives the pump assembly in response to determining that the plate is in contact with the surface of the material; and
moving the pump assembly and the plate toward a bottom end of the container while the motor is driving the pump assembly.

13. The method of claim 12, wherein moving the pump assembly and the plate relative to the container includes providing airflow into one of a first cavity and a second cavity of the piston-cylinder assembly while allowing airflow out of another one of the first and second cavities, and wherein the first and second cavities are disposed within a cylindrical bore and are separated from each other by a piston that is movable within the cylindrical bore.

14. The method of claim 13, further comprising determining whether the piston has reached a predetermined position within the cylindrical bore.

15. The method of claim 14, further comprising running the motor and moving the pump assembly and the plate toward the bottom end of the container for a predetermined amount of time after determining that the piston has reached the predetermined position.

16. The method of claim 15, further comprising shutting down the motor after the predetermined amount of time.

17. The method of claim 16, further comprising moving the pump assembly and plate away from the bottom end of the container after the predetermined amount of time.

18. The method of claim 17, further comprising providing airflow into a space between the plate and the bottom end of the container while the pump assembly and plate are moving away from the bottom end of the container.

19. The method of claim 18, further comprising controlling the airflow into the space based on an air-pressure within the space.

20. The method of claim 19, wherein a proximity sensor determines whether the piston has reached the predetermined position within the cylindrical bore.

* * * * *